W. I. CASSELMAN.
MACHINE FOR TURNING IRREGULAR FORMS.

No. 12,192. Patented Jan. 9, 1855.

UNITED STATES PATENT OFFICE.

WILLIAM I. CASSELMAN, OF VERNON, NEW YORK.

IMPROVED MACHINE FOR TURNING IRREGULAR FORMS.

Specification forming part of Letters Patent No. 12,192, dated January 9, 1855.

*To all whom it may concern:*

Be it known that I, WILLIAM I. CASSELMAN, of Vernon, in the county of Oneida and State of New York, have invented a new and useful Improvement in Machinery for Turning Irregular Forms; and I do hereby declare that the following is a full, clear, and exact description of the same, reference being had to the accompanying drawings, forming part of this specification, in which—

Figure 1:
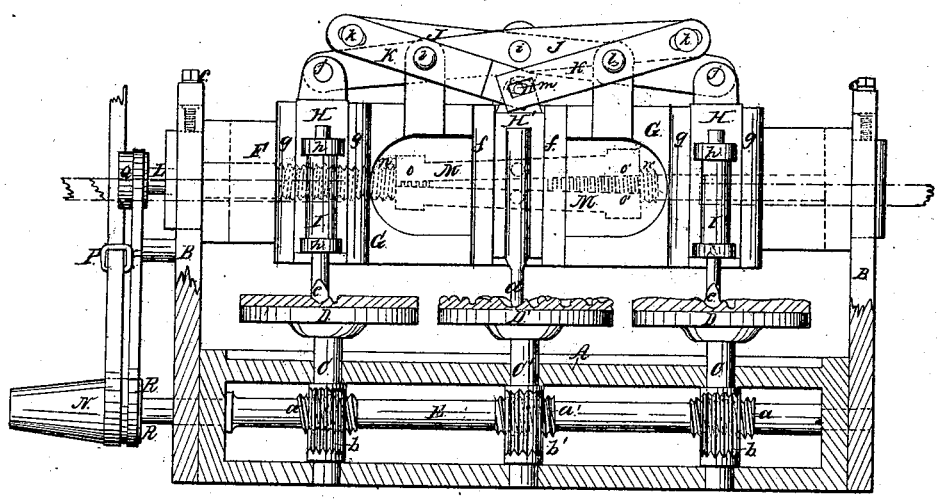
Figure 2:
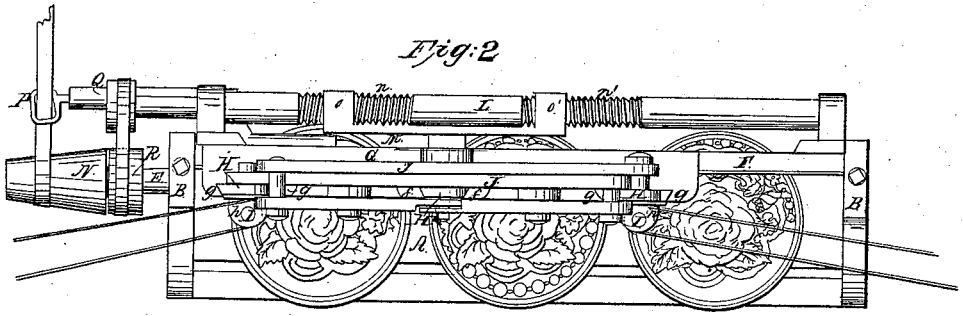

Figure 1 is a front elevation, and Fig. 2 a top view, of a machine constructed according to my invention.

Similar letters of reference indicate corresponding parts in both figures.

My invention relates to that description of machinery which produces irregular surfaces by a true circular motion of the work and a movement of the tool produced by a pattern in a direction parallel with the axis on which the work revolves.

It consists in an improved and more convenient mode of arranging and combining the work-tables, pattern-table, cutting-tools, and tracer, whereby greater facility is afforded for turning two or more articles at the same time from the same pattern.

To enable others skilled in the art to make and use my invention, I will proceed to describe its construction and operation.

A is a bed, and B B are standards constituting the framing of the machine.

C C C' are three upright shafts arranged in the same plane at equal distances apart and supported on suitable bearings in the bed A. These shafts carry at their upper ends the horizontal tables D D D', whose faces are all in the same plane. The central table D' is to support the pattern, and the outside tables are to carry the work. All three tables receive rotary motion at the same velocity through endless screws $a\ a\ a'$ on the main shaft E, gearing with worm-wheels $b\ b\ b'$ on their shafts C C C'.

F is a horizontal slide, which is adjustable at different elevations above the work-tables in slots in the standards B B by means of screws $c\ c$. To this slide is fitted the sliding carriage G, which carries both the tracer $d$ and the tools $e\ e$, the tracer being attached to a slider H', which is fitted to work between vertical slides $f\ f$ in front of the center of the carriage G, and the tools being carried by sliders H H, which are fitted to work between vertical slides $g\ g$ on opposite sides of the tracer-slider H'. The cutting-tools $e\ e$ may be of any description commonly used in turning the material to be operated upon; but I prefer to use rotary cutters, such as are commonly used in machine-carving. These cutters are secured in vertical stocks I I, which are caused by suitable means (not shown) to rotate in suitable bearings $h\ h$ on the sliders H H. The points of the tools and the tracer should stand in the same vertical plane, which should be parallel with and very near to if not in the same plane in which the axes of the tables D D D' stand, and the points of the tool should be at a distance from the points of the tracer exactly equal to the distances between the tables D' and D D. The tool-sliders H H are suspended by studs $j\ j$ from the ends of two levers J J of the first order, which have the same fulcrum $i$ attached to the carriage G directly over the center. The opposite ends of these levers are connected by studs $k\ k$ with the ends of two shorter levers K K of the first order, which work on fulcra $l\ l$, secured to the carriage, the tracer-slider H' being suspended by a stud $m$ from the opposite arms of the said levers. The studs $j\ j$, $k\ k$, and $l$, forming the connections between the levers and suspending the tool and tracer-sliders, are all fitted in slots to provide for the play which is necessary for the movements of the levers; but the connections may be made by short links or otherwise. This arrangement of levers will cause the tool-sliders and tracer-slider to rise and fall simultaneously.

The carriage G receives the necessary motion to carry the tracer and tools across the pattern and work through one or the other of two screws $n\ n'$ on a shaft L, which receives motion by a belt running over a pulley Q from a pulley R on the main shaft, one of the said screws being right-handed to move the carriage in one direction and the other left-handed to move it in the other direction. The nuts O O', which belong to the said screws, are divided into two parts and attached to the opposite ends of two levers M M, attached to the carriage, and the reversal is effected by closing one nut upon the screw and opening the other, which is done by simply changing the position of the levers M M. The nuts when closed will require to be held so by a catch or some fastening; but I have shown no means of keeping them closed, as the means by which the reversal of the movement of the carriage is effected form no part of this invention, the device shown being common and only one of many which might have been employed with equal advantage.

There is a belt-shipper P attached to the carriage G for the purpose, as the carriage moves the tool and tracer toward or from the center of the pattern and work, of shifting the main driving-belt along the cone-driving pulley N on the main shaft to make the velocity of revolution of the work-tables proportionate to the distance of the tools from the centers of the work-tables.

In operating with this machine the pattern is secured concentrically upon the table D' and the wood, stone, or other material to be operated upon secured to the tables D D, when the machine may be set in motion. The operation may commence at the center or periphery of the pattern. As the tables revolve, the tracer and tools are caused by the movement of the carriage G on the slide F to move slowly across the face of the pattern and work, and the tracer as it ascends and descends in tracing over the undulating surface of the pattern gives by means of the levers J J K K a corresponding movement to the cutters and causes them to cut the work to the form of the pattern. The levers may have the lengths of their arms so proportioned as to give the cutters exactly the same amount of upward and downward motion as the tracer to give the work precisely the form of the pattern, or else they may be proportioned to produce greater or less elevations and depressions than those in the pattern.

Two or more revolving work-tables may be employed on each side of the pattern-table, with a corresponding number of tool-slides and tools attached to the carriage G. These additional tools may be governed by the same pattern, in order to effect which the levers J J may be extended, or different levers of corresponding character may be employed; but in either case the additional tool-slides will require each a distinct lever K.

I do not claim the suspension of a tool from a lever which transmits to it a movement corresponding with the movement given to the tracer by passing over the undulating surface of the pattern; neither do I claim the employment of a tool thus suspended above a revolving work-table; but

What I claim as my invention, and desire to secure by Letters Patent, is—

The particular mode herein described of arranging and combining a pattern-table, two or more work-tables, a tracer, and a number of cutting-tools to correspond with the number of work-tables—that is to say, the work-tables and pattern-table being arranged with their axes in the same plane, and the tracer, cutting-tools, and the levers which connect them being all attached in such a way to a carriage which has a movement in a direction perpendicular to the axes of the revolving tables, but parallel to the plane of the said axes, that the points of the cutters and tracer stand in the same plane or in a plane near to and parallel with the plane of the axes of the tables and will all bear at all times the same relation to each other and to the pattern and work.

WILLIAM I. CASSELMAN.

Witnesses:
S. H. WALES,
O. D. MUNN.